United States Patent [19]

Blanchart et al.

[11] 4,137,371

[45] Jan. 30, 1979

[54] ELECTROCHEMICAL ZINC-OXYGEN CELL

[75] Inventors: Alain P. O. Blanchart, Balen; Gustaaf J. F. Spaepen, Dessel; Constantine W. M. V. A. De Brandt, Itterbeek, all of Belgium

[73] Assignee: Electrochemische Energieconversie N.V., Mol, Belgium

[21] Appl. No.: 812,892

[22] Filed: Jul. 5, 1977

[30] Foreign Application Priority Data

Jul. 7, 1976 [NL] Netherlands .......................... 7607471

[51] Int. Cl.² ..................... H01M 8/08; H01M 12/04
[52] U.S. Cl. ......................................... 429/29; 429/30; 429/41
[58] Field of Search ............... 429/27, 41, 29, 28, 429/30, 27, 42

[56] References Cited

U.S. PATENT DOCUMENTS

| | | | |
|---|---|---|---|
| 2,938,064 | 5/1960 | Kordesch | 429/27 |
| 3,117,034 | 1/1964 | Tirrell | 429/41 |
| 3,881,959 | 5/1975 | Tsuchida | 429/27 |

*Primary Examiner*—Donald L. Walton
*Attorney, Agent, or Firm*—Cushman, Darby & Cushman

[57] ABSTRACT

The invention relates to an electrochemical zinc-oxygen cell comprising an oxygen electrode containing a porous electrically conductive layer, a zinc electrode, a diffusion of zincate restricting membrane, preferably an ionexchanging membrane, which is joined directly to the oxygen electrode between the porous layer of this electrode and the zinc electrode, and an electrolyte space between the membrane and the zinc electrode containing a liquid basic electrolyte. By preference the membrane is only slightly permeable for the electrolyte.

With this cell no poisoning of the electrochemically active material occurs.

5 Claims, 3 Drawing Figures

ELECTROCHEMICAL ZINC-OXYGEN CELL

BACKGROUND OF THE INVENTION

This invention relates to an electrochemical zinc-oxygen cell comprising an oxygenelectrode containing a porous electrically conductive layer, a zinc electrode, a liquid basic electrolyte and a diffusion of zincate restricting membrane between the porous layer of the oxygen electrode and the zincelectrode. Such a cell is known from the French patent specification No. 1,492,284 and the thereby belonging patent of addition 91.138.

In electrochemical cells of this type the oxidant need not be contained in the cell but atmospheric air can be used as such. One side (the gas contacted side) of the oxygen electrode is in contact with the gas containing molecular oxygen, e.g. air, the other side (the liquid contacted side) with a suitable electrolyte. The electrode reactions take place in the pores, near the gas-liquid interface. The porous electrically conductive layer usually possesses electrocatalytic properties. The current generated, or accepted, across the electrode, is accumulated, respectively distributed by a collector.

In the known zinc-oxygen cells there is the problem of impairment of the electrocatalytically active material in the cathode by zincate ions, resulting in a decrease of the electrocatalytic activity. This impairment may even result in the pores of the cathode getting blocked by corrosion products. It would be possible to limit the consequences of this problem to some extent by raising the catalyst concentration in the cathode material and/or using a thicker electrocatalytically active layer. However, this calls for more, expensive electrocatalytically active material. Another possibility would be raising the gas pressure on the gas contacted side of the cathode. However, this can result in bubble formation on the electrode, with loss of the favourable properties.

It has already been suggested to introduce a membrane, for example an ion-exchanging membrane, which is permeable for electrolyte, between the zinc electrode and the oxygen electrode. This is not sufficient as the diffusion of zincate-ions to the oxygen electrode is not sufficiently prevented. In the cells of known type the internal electrical resistance is unacceptably high.

The object of the invention is to provide an electrochemical zinc-oxide cell in which the drawbacks outlined above are obviated.

DETAILED DESCRIPTION OF THE INVENTION

According to the present invention a suitable electrochemical zinc-oxygen cell comprises an oxygen electrode containing a porous electrically conductive layer, a zinc electrode, a diffusion of zincate restricting membrane being joined directly to the oxygen electrode between the porous layer of this electrode and the zincelectrode, and an electrolyte space between the membrane and the zincelectrode, containing a liquid basic electrolyte.

As a membrane, an ion exchanging membrane is preferred. In a more preferred embodiment, a cation exchanging membrane is used. Hereinafter the membrane is always described as ionexchanging, although in a less favourable embodiment, this property may be absent. The membrane is, by preference, only slightly permeable for electrolyte.

As a result of this the penetration, during operation, of harmful ions, particularly zincate ions, from the liquid electrolyte into the porous electrically conductive layer, is effectively opposed. It has been found possible in this way to prevent poisoning of the electrochemically active material by zincate ions. Furthermore a very low internal resistance can be attained in the electrochemical cell according to the invention.

The construction of the electrochemical cell according to the invention is simple and the cell is reliable in operation, and can be made in a simple way. In thise case, the ion-exchanging membrane is preferably affixed to the oxygen electrode, so that the cell is of compact and sturdy construction. Particularly good adhesion is obtained if the ion-exchanging membrane is an ion-exchanging layer forming part of the oxygen electrode, and contains a binder identical with the binder used in the porous electrically conductive layer of the oxygen electrode. The ion-exchanging layer is in contact with the porous electrically conductive layer, either direct, or through an intermediate layer which also contains the same binder. Such a composite electrode possesses high mechanical strength, so that there is only little chance of the two layers getting detached from each other, which would interfere with the course of the process. The electrode can be manufactured as an integrated whole in a simple and stanardized process, in which the tolerance requirements imposed can be easily satisfied. Also, the ion-exchanging layer may be kept very thin while preserving the effect desired, so that the internal resistance of the zinc-oxygen cell may be smaller than if a non-adhering ion-exchanging membrane were used.

Preferred as binder for common use in the ion-exchanging layer and the porous electrically conductive layer is a polymeric material, e.g. polyethylene, polypropylene, or poly(vinylchloride). Most preferred is poly(tetrafluoroethylene). By means of the type and concentration of the binder in the ionexchanging membrane, it is possible to influence the permeability of the membrane for the electrolyte. This is known practice in the fuel cell technology.

The construction of the oxygen electrode — apart from the ion-exchanging layer, if applied — may be conventional. Various suitable forms are known to the expert in the field. The porous electrically conductive layer contains, in addition to the binder, a conductive material, e.g. finely divided metal or carbon. This conductive material may itself be catalytically active, and catalyze the electrochemical conversion in the porous layer; by preference, however, use is made of a separate catalytic material. The catalytic material may be, for instance, silver in powder form, or platinum black, palladium black, or a mixture thereof. The catalytically active material may also be no-powdery, but be coherent and porous; the porous layer can then be obtained by sintering of a powder of the catalytically active material concerned, usually a metal, followed by application of the binder.

The concentration of the binder in the porous electrically conductive layer can be varied within wide limits, but is preferably kept between 5 and 50% by weight, related to the weight of this layer, more in particular between 8 and 30% by weight, according as it is desirable to make the layer more strongly hydrophilic or more strongly hydrophobic.

The concentration of the binder in the ion-exchanging layer may also be varied within wide limits; it is preferably kept between 5 and 50% by weight, related to the weight of this layer, more in particular between 5 and 25% by weight.

The intermediate layer — if applied — consists of a material permeable to the electrolyte, which material need not be electrically conductive, e.g. of a mixture of a hydrophillic resin and the common binder.

The zinc electrode in the zinc-oxygen cell according to the invention may be any suitable zinc electrode. Various suitable constructions are known to the expert in the field.

The anolyte, contained between the zinc electrode and the ion-exchanging membrane, consists, for instance, of a concentrated (e.g. 8 M) solution of sodium hydroxide, potassium hydroxide, containing zincate ions.

The membrane may consist, for instance, of a plastic. By preference it contains an ion-exchanging material, e.g. an ion-exchanging resin. The ion-exchanging material may be, for instance, a polystyrene resin or a similar resin, with attached sulphonic acid groups, carboxylic acid groups, or other cation-exchanging groups, or amino groups, substituted ammonium groups, or other anion-exchanging groups.

The invention will be further elucidated in the following, nonrestrictive examples and with reference to the comparative experiment.

EXAMPLE I

Figure 3:
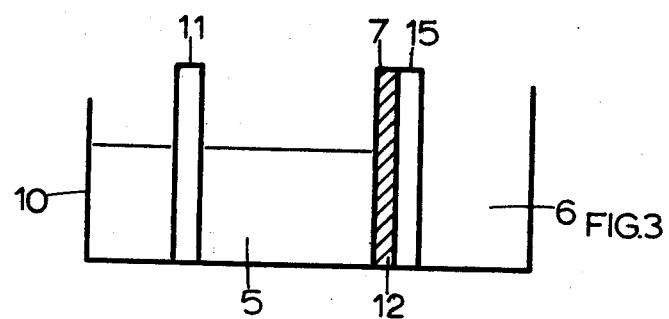
FIG. 3 shows diagrammatically a zinc-oxygen cell.

The zinc-oxygen cell is shown diagrammatically in FIG. 3. The casing 10 contains a conventional zinc electrode 11 and an oxygen electrode 12. The electrolyte, indicated by 5, consists of an 8 M KOH solution. On the gas side of the oxygen electrode 12 there is a gas space 6, in which air can circulate.

Instead of air, the oxidant may be another gas containing molecular oxygen, e.g. pure oxygen, air diluted with nitrogen or another inert gas, oxygen-enriched air, or other mixtures of oxygen and an inert gas. The electrolyte 5 may also be circulated through the space for the electrolyte, by means not shown in the drawing.

Figure 2:
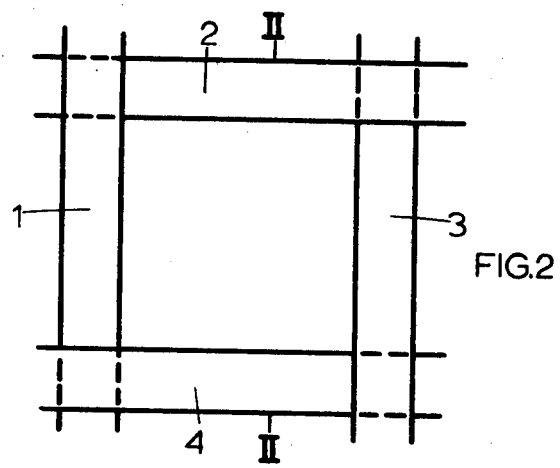
FIG. 2 is a representation of a section parallel to the oxygen-electrode surface.
Figure 1:
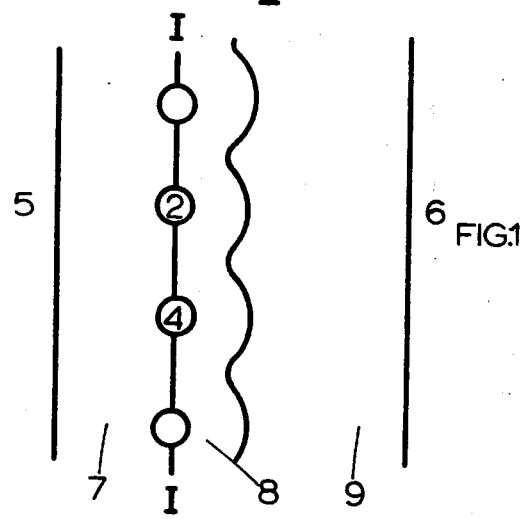
FIG. 1 is a representation of the oxygen electrode normal to the electrode surface.

The oxygen electrode 12 consists of a cation-exchanging layer 7 and a porous electrically conductive layer 15. Layer 15 itself comprises three sub. layers, formed by the collector gauze, a catalytic layer 8, and a layer 9 impermeable to liquid but permeable to gas, as indicated hereinafter. The diagrammatic FIGS. 1 and 2 show the build-up of the oxygen electrode 12 in more detail. Like numbers refer to like parts. FIG. 1 is a representation of a section of the oxygen electrode 12 normal to the electrode surface, along the line II—II in FIG. 2. FIG. 2 is a representation of a section parallel to the electrode surface, along the line I—I in FIG. 1.

The nickel wires 1, 2, 3 and 4 form part of the collector gauze. The thickness of thise wires is about 150 microns; the gauze is 50 mesh. Instead of wire gauze, a perforated nickel plate or another type of current collector may be used.

On the liquid contacted side (see 5) of the nickel gauze there is the ion-exchanging layer 7, which consists of a mixture of a cation-exchanging resin (commercially obtainable as Dowex-1, particle size 200–400 mesh, 60% wt. water), and the binder. The ion-exchanging resin is a polystyrene containing substituent sulphonic acid group and cross-linked with divinylbenzene; the ion exchanger is in the potassium form. The ion-exchanging layer is only slightly permeable for the electrolyte.

The binder is poly(tetrafluoroethylene), and constitutes 20% by weight of layer 7. The particle size of layer 7 is on average 15 microns; the porosity is 5%. The average thickness of layer 7 is 150 microns; at the nickel wires, the layer is thinner than half-way between them, so that the electrode surface is plane, without protuberances.

On the gas contacted side (see 6) of the nickel gauze there is the catalytic layer 8, consisting of a mixture of silver-containing carbon and the binder, which is identical to that contained in layer 7, i.e. poly(tetrafluoroethylene). The binder constitutes 20% by weight of layer 8. The silver content of the silver-containing carbon is 10% by weight; the electrode contains 0.8 mg of silver per sq. cm of electrode surface area. The porosity of layer 8, in terms of pores accessible to the electrolyte, is 30%. Layer 8 has an average thickness of 115 microns; it, also, is thinner at the nickel wires than half-way between them, as described with reference to layer 7.

To layer 8 there is further joined, on the gas side, a liquid-impermeable but gas-permeable layer 9, preventing leak-through of electrolyte to the gas space 6. Layer 9 consists of poly(tetrafluoroethylene), the substance used as binder in layers 7 and 8. The porosity of layer 9 is 70%, its weight 14 mg per sq. cm of electrode surface area. The average thickness is 235 microns.

This zinc-air cell is operated and its behaviour monitored by measurement. At the start of the measurement, the cell produces 100 mA/sq. cm, at 0.9 V. After about 1000 hours of operation, the cell still produces satisfactorily. The voltage drop resulting from decrease of the performance of the cathode is of the same order as in a hydrogen-air fuel cell with electrodes of the same kind, in which latter cell, naturally, no poisoning of the cathode by zincate ions can occur. This shows that the poisoning problem has been completely obviated.

Comparative experiment

A similar zinc-air cell is operated as described in Example I, with an identical zinc electrode, but with an air electrode not having an ion-exchanging layer (although similar). At the start of the measurement this cell also produces 100 mA per sq. cm at 0.9 V. However, the output of the cell decreases very fast, and after only about 50 hours the cell hardly produces any current, as a result of poisoning of the cathode.

EXAMPLE II

A similar zinc-air cell is operated as is described in Example I, with an identical zinc electrode, but this time with an air electrode containing an anion-exchanging resin instead of the cation-exchanging resin.

The resin consists of a polystyrene containing substituent quaternary ammonium groups and cross-linked with divinylbenzene; it is commercially obtainable as Dowex AG 50 W-X 12, particle size 200–400 mesh, water content 42–48% by weight. At the start of the measurement the cell produces 90 mA per sq. cm, at 0.9 V. After 200 hours of operation the cell is still producing satisfactorily.

What is claimed is:

1. Electrochemical zinc-oxygen cell comprised of,
   a. an oxygen electrode comprised of a porous electrically conductive layer and an ion-exchanging layer, said layers containing an identical binder,
   b. a zinc electrode; and
   c. an electrolyte space between said ion-exchanging layer and said zinc electrode which contains a liquid basic electrolyte.

2. Zinc-oxygen cell of claim 1 wherein the ion-exchanging layer is a cation-exchanging layer.

3. Zinc-oxygen cell of claim 2 wherein the ion-exchanging layer is only slightly permeable to the electrolytes.

4. Zinc-oxygen cell according to claim 3, wherein the common binder is a polymeric material.

5. Zinc-oxygen cell according to claim 4, wherein the binder is poly(tetrafluoroethylene).

* * * * *